United States Patent [19]
Tsuruishi

[11] 3,802,178
[45] Apr. 9, 1974

[54] ELECTRIC TIMEPIECE WITH LIGHT RESPONSIVE BATTERY RECHARGING

[75] Inventor: Yuki Tsuruishi, Suwa, Japan

[73] Assignee: Kabushiki Kaisha Suwa Seikosha, Tokyo, Japan

[22] Filed: Feb. 2, 1972

[21] Appl. No.: 222,786

[30] Foreign Application Priority Data
Feb. 12, 1971   Japan................................ 46-5578

[52] U.S. Cl............................ 58/23 TF, 331/116 M
[51] Int. Cl................................................. G04c 3/00
[58] Field of Search.... 58/23 R, 23 A, 23 C, 23 TF, 58/23 MV, 28 R, 28 A; 250/200, 215; 318/127; 331/116 M

[56] References Cited
UNITED STATES PATENTS

| | | | |
|---|---|---|---|
| 2,915,577 | 12/1959 | Bronstert...................... | 58/23 BA X |
| 2,976,470 | 3/1961 | Krassoievitchet et al. ....... | 58/23 BA |
| 3,427,797 | 2/1969 | Kimura et al.................... | 58/23 BA |
| 3,509,712 | 5/1970 | Grotioski............................... | 58/23 |
| 3,596,461 | 8/1971 | Reid................................... | 58/28 A |
| 2,908,174 | 10/1959 | Hetzel.............................. | 58/23 TF |

FOREIGN PATENTS OR APPLICATIONS
898,366    6/1962   Great Britain...................... 58/23 C

*Primary Examiner*—Richard B. Wilkinson
*Assistant Examiner*—Edith Simmons Jackmon
*Attorney, Agent, or Firm*—Blum, Moscovitz, Friedman & Kaplan

[57] ABSTRACT

An electric timepiece having photoelectric elements mounted on said timepiece for exposure to the ambient light for recharging a secondary battery, a semiconductor element being provided intermediate said photoelectric elements and said secondary battery for preventing reverse discharge of said secondary battery through said photoelectric elements when the output of the latter is small. A drive circuit is operatively coupled to said secondary battery for driving a drive circuit including a two-terminal drive coil positioned for applying energy to the magnetic circuit of a mechanical vibrator used as a time keeping means.

2 Claims, 5 Drawing Figures

3,802,178

ELECTRIC TIMEPIECE WITH LIGHT RESPONSIVE BATTERY RECHARGING

BACKGROUND OF THE INVENTION

This invention relates to electric timepieces having photoelectric elements for charging the secondary battery, whereby said secondary battery is substantially permanent. While it has been proposed in the past to use solar batteries for timepieces, the incorporation of such devices in pocket watches or wrist watches has not previously proven practical for a numbeof reasons. First, since the conditions of use of pocket and wrist watches differs with the individual, there is no assurance that the solar batteries can assure continuous operation of a watch. Second, it has proved difficult to produce a reliable watch adapted to endure the voltage variations in the secondary battery. The secondary batteries utilized in such watches generally having inferior discharge characteristics so that the voltage thereof differs from 1.2 to 1.5 voltage in general use. Third, it has proved difficult to drive a time-keeping vibrator where the average voltage is only 1.25 volts, the average voltage of the NiCd battery suitable for use as a secondary battery in a watch.

SUMMARY OF THE INVENTION

Generally speaking, in accordance with the invention, an electric timepiece is provided having photoelectric elements mounted thereon for exposure to ambient light and a secondary cell connected through a semiconductor element to said photoelectric element for charging thereby said semiconductor element preventing the reverse discharge of the secondary battery when the output of the photoelectric element is small. A mechanical vibrator forming the time keeping means of the timepiece is provided having a magnetic circuit operatively coupled with a two-terminal drive coil which in turn receives driving pulses from a drive circuit. Power for said drive circuit is derived from said secondary battery.

The drive circuit may include a PNP and an NPN transistor having said two-terminal coil connected between the respective collectors thereof. The mechanical vibrator may be either a balance wheel or a tuning fork, the drive circuit being adapted for relatively low power consumption.

Accordingly, it is an object of this invention to provide an electronic timepiece wherein a secondary battery may be charged by photoelectric elements, and in particular, by solar batteries.

Another object of the invention is to provide an electric timepiece wherein a secondary battery may be charged by photoelectric elements, and wherein said timepiece remains accurate despite the voltage variations of the secondary battery while the driving energy is relatively low.

Still other objects and advantages of the invention will in part be obvious and will in part be apparent from the specification and drawing.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

Figure 1:
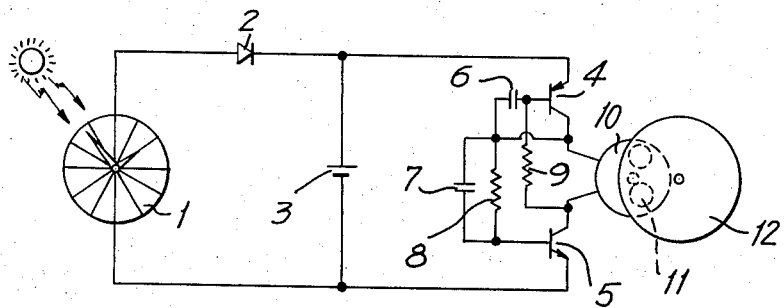
FIG. 1 is a circuit diagram of one embodiment of the electric timepiece in accordance with the invention.

Referring now to FIG. 1, the electric watch depicted includes a solar battery 1 consisting of 12 pie-shaped solar cells fixed, in this embodiment, on the watch dial. These cells are preferably connected in series in order to obtain the maximum voltage possible for charging secondary battery 3. However, these cells may be connected in two series-connected groups of six cells each, the two groups being connected in parallel. Further, a greater or fewer number of such cells may be utilized depending on the dimensions thereof. While in the embodiment of FIG. 1, the cells are fixed on the dial itself, these cells may be mounted on the watch case.

The output current from solar battery 1 flows through diode 2 into a secondary battery 3. When the output of the solar battery 1 is zero or very small, such as would be the case at night, diode 2 is positioned so that it prevents the flow of discharge current from secondary battery 3 to solar battery 1.

Said secondary battery may be formed from a small NiCd battery having an average voltage of 1.25 volts. Such NiCd batteries have a smaller capacity than other types of batteries incorporated in electric watches, and accordingly, the energy consumed in the operation of the watch must be minimized. This result is achieved through the driving circuit of FIG. 1 which produces accurate time keeping while consuming small amounts of energy.

In said driving circuit, a PNP transistor is connected with its emitter-collector path in series with a two-terminal driving coil and the emitter-collector path of an NPN transistor 5. The collectors of the respective transistors are connected to said coil. A decoupling condenser is connected between the base and collector of transistor 4 to prevent oscillation of the circuit at high frequencies. A coupling condenser 7 is connected in parallel with base bias resistor 8, said base bias resistor being connected between the base of transistor 5 and the collector of transistor 4. Resistor 9 provides base bias for transistor 4, being connected between the base thereof and the collector of transistor 5.

The mechanical vibrator of the watch of FIG. 1 consists of a balance wheel formed from two thin boards mounted in spaced relation for oscillation on a balance staff. A magnetic circuit is mounted on said boards consisting of two pairs of permanent magnets 11 mounted in facing relation on the respective inner faces of said boards. The polarity of said permanent magnets is selected so that a magnetic field flows in the space between said boards so as to cut drive coil 10 positioned therebetween during the oscillation of said balance wheel. The thin round boards of the balance wheel 12 may be formed of a material having a high permeability to form part of the magnetic circuit. The driving circuit of FIG. 1 can be characterized as an unstable blocking oscillator, and self oscillates even when the balance wheel 12 is stopped. For this reason, the oscillation of the balance wheel can readily be started. The circuit is extremely efficient, since the balance wheel is driven by only a single two-terminal coil, rather than separate detecting and drive coils, thereby permitting a maximizing of the number of turns of the coil within the limited confines of the base between the two boards of the balance wheel.

Figure 3:
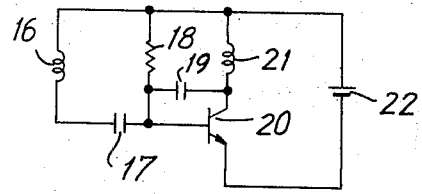
FIG. 3 is a circuit diagram of a prior art driving circuit for a balance wheel.

A conventional driving circuit incorporating separate driving and detecting coils is depicted in FIG. 3. In said circuit, detecting coil 16 is connected in series with coupling condenser 17 to the base of transistor 20. A driving coil 21 is connected in series with the emitter-collector path of said transistor and a battery 22. A bias resistor 18 interconnects the base of transistor 20 and the positive of battery 22. A decoupling condenser 19 is connected between the base and collector of transistor 20 to prevent high frequency oscillation of the circuit. Since two coils, detecting coil 16 and driving coil 21, must occupy the space between the round plates of the balance wheel, the number of turns of driving coil 21 is substantially less than the number of turns of the two-terminal drive coil 10 of FIG. 1. For this reason, the drive circuit of FIG. 3 requires a greater amount of current than the circuit of FIG. 1, a highly unfavorable result where a NiCd battery of small capacity is used.

Generally, a wrist watch incorporating solar batteries can be fully charged during the summer, but would not be fully charged during the winter. However, NiCd batteries can maintain their normal voltage for the several months of the winter season, insuring the continuous and permanent operation of the watch. However, in order to insure operation of the watch during a 5 or 6 month period with only the NiCd battery of small capacity, without further charging by the solar batteries, a circuit such as is depicted in FIG. 1, wherein power consumption is minimized, must be utilized.

Figure 2:
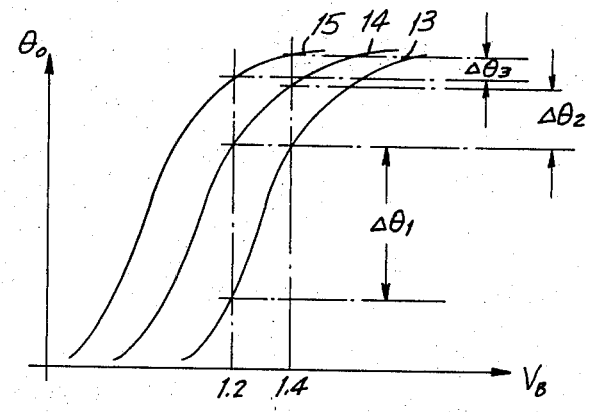
FIG. 2 is a graphical representation of the voltage-amplitude characteristics of the electric timepiece of FIG. 1, and the prior art electric timepieces.

FIG. 2 depicts the voltage-amplitude characteristics of balance wheel 12, wherein the axis of abscissa represents the maximum amplitude $\theta_0$ and the axis of ordinates represents the driving voltage $V_B$ of a battery such as secondary battery 3. Curves 13 and 14 show the voltage-amplitude characteristics of the circuit of FIG. 3, while curve 15, shows the voltage-amplitude characteristics of the circuit of FIG. 1. Specifically, curve 13 represents the normal configuration of FIG. 3, while curve 14 represents a configuration of the circuit of FIG. 3 wherein the elements are selected to be particularly adapted for a low-voltage battery. In normal use, the voltage of a NiCd battery varies from 1.2 to 1.4 volts. Accordingly, the amplitude variation of a balance wheel coupled with the conventional drive circuit of FIG. 3 would amount to $\Delta\theta_1$ or $\Delta\theta_2$. From a consideration of these functions, it is apparent that the accuracy of the watch varies materially with variations in voltage. On the other hand, the variation of the amplitude of the balance wheel of FIG. 1 is only $\Delta\theta_3$, a relatively small value. Thus, the circuit of FIG. 1 is particularly adapted to function efficiently in the face of variations in applied voltage.

While the embodiment of FIG. 1 incorporates a balance wheel, the driving circuit is also suitable for use with a tuning fork. However, a tuning fork is substantially superior in amplitude-frequency characteristics and the frequency of a tuning fork is substantially constant in the face of voltage variations. Further, the driving efficiency of the tuning fork can be increased more than that of a balance wheel so that the tuning fork is particularly adapted to be driven by a low voltage at low power consumption levels. For this reason, a more conventional drive circuit can be utilized with a tuning fork.

Figure 4:
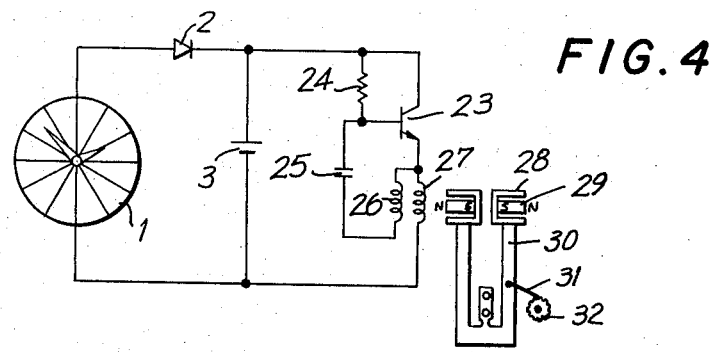
FIG. 4 is a second embodiment of an electric timepiece in accordance with the invention incorporating a tuning fork as the mechanical vibrator.

FIG. 4 shows still another embodiment of the invention wherein a tuning fork is utilized as a mechanical vibrator for providing a time base. In said embodiment, drive transistor 23 is connected with its emitter-collector path in series with a drive coil 27 and battery 3. A base bias resistor 24 couples the base and collector of said transistor. A detecting coil 26 is connected in series with a condenser 25 between the base and emitter of transistor 23.

The tuning fork 30 is provided with pair of cup-shaped members 28 at the ends thereof having permanent magnets 29 mounted therein. The coils 26 and 27 cooperate with the permanent magnets to maintain the oscillation of the tuning fork. A spring stick 30 projects from one arm of the tuning fork for driving a ratchet wheel 32 to drive the time train of the timepiece.

Figure 5:
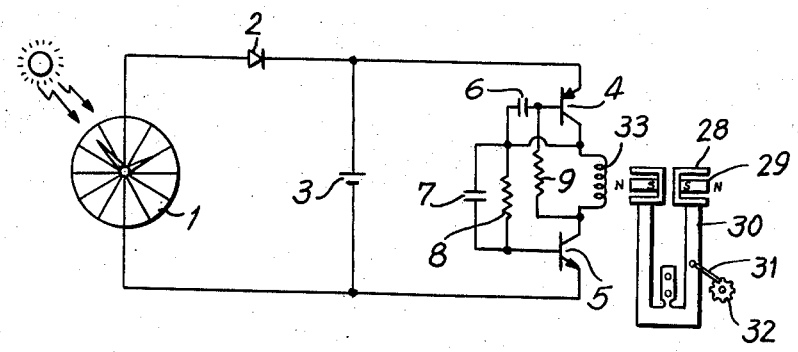
FIG. 5 is a third embodiment of an electric timepiece in accordance with the invention incorporating a tuning fork as the mechanical vibrator.

Due to the high efficiency of the tuning fork, by increasing the number of winding turns of drive coil 27 the extent possible, the power consumption of the arrangement may be minimized to a relatively small value and sufficient precision can be obtained from the NiCd battery of small capacity. As depicted in FIG. 5 wherein like reference numerals denote like elements, by substituting a driving circuit incorporating only a single two-terminal coil 33, the amount of power required for driving can be reduced even further.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic timepiece comprising photoelectric element means mounted on said timepiece for exposure to ambient light; a secondary Ni-Cd battery; means connecting said secondary battery to said photoelectric element means including semiconductor element means for preventing discharge current from said secondary battery to said photoelectric element means when the output of said photoelectric element means is small; a mechanical vibrator for providing time keeping means wherein said mechanical vibrator is a tuning fork and including a magnetic circuit; a two-terminal drive coil positioned for cooperation with said magnetic circuit for sustaining the oscillation of said mechanical vibrator; and drive circuit means coupling said secondary battery and said two-terminal drive coil for applying an oscillatory drive signal to said drive coil adapted to maintain the amplitude of said mechanical vibrator nearly constant when the voltage of said secondary Ni-Cd battery varies, said drive circuit means including a PNP and an NPN transistor, said two-terminal drive coil being connected between the respective collectors of said transistors, and means resistively coupling the base of each transistor to said two-terminal drive coil.

2. An electronic timepiece as recited in claim 1, including a first condenser connected between a base of one of said transistors and a collector of the other of said transistors; a first base bias resistor connected between the base of said PNP transistor and the collector of said NPN transistor; a second base bias resistor connected the base of said NPN transistor and the collector of said PNP transistor; and a second condensor connected between a collector electrode of one of said transistors and a base electrode of the other of said transistors, the emitter of said PNP transistor being connected to the positive of said secondary battery, the emitter of said NPN transistor being connected to the negative of said secondary battery.

* * * * *